(12) United States Patent
Younger et al.

(10) Patent No.: US 12,492,600 B2
(45) Date of Patent: Dec. 9, 2025

(54) EXPANDABLE WELLBORE LOSS CONTROL PATCH

(71) Applicant: Saudi Arabian Oil Company, Dhahran (SA)

(72) Inventors: Rae Andrew Younger, Aberdeen (GB); Steven John Burnett, Aberdeen (GB); Richard Mark Pye, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/672,837

(22) Filed: May 23, 2024

(65) Prior Publication Data

US 2025/0361778 A1 Nov. 27, 2025

(51) Int. Cl.
  *E21B 21/00* (2006.01)
(52) U.S. Cl.
  CPC .................. *E21B 21/003* (2013.01)
(58) Field of Classification Search
  CPC .... E21B 21/003; E21B 43/103; E21B 43/105; E21B 43/08; E21B 43/10; F16L 9/16
  See application file for complete search history.

(56) References Cited

U.S. PATENT DOCUMENTS

| | | | |
|---|---|---|---|
| 341,327 A | 5/1886 | Fay | |
| 2,927,775 A | 3/1960 | Hildebrandt | |
| 3,282,338 A | 11/1966 | Walther et al. | |
| 3,422,631 A | 1/1969 | Silverman | |
| 3,578,078 A | 5/1971 | Shillander | |
| 4,191,493 A | 3/1980 | Hansson | |
| 5,119,862 A | 6/1992 | Maimets et al. | |
| 5,186,215 A | 2/1993 | Gilleland | |
| 5,366,012 A | 11/1994 | Lohbeck | |
| 5,388,648 A | 2/1995 | Jordan | |
| 5,501,248 A | 3/1996 | Kiest | |
| 5,853,049 A | 12/1998 | Keller | |
| 5,971,030 A * | 10/1999 | Maimets | F16L 55/163 138/148 |
| 6,012,526 A | 1/2000 | Jennings et al. | |

(Continued)

FOREIGN PATENT DOCUMENTS

| | | |
|---|---|---|
| EP | 0899420 | 3/1999 |
| EP | 2770159 | 8/2014 |

(Continued)

*Primary Examiner* — Caroline N Butcher
(74) *Attorney, Agent, or Firm* — Fish & Richardson P.C.

(57) ABSTRACT

A wellbore patching system includes a radially expandable tube member including a sheet wrapped in a spiral. The sheet includes a first circumferential edge and a second circumferential edge opposite the first circumferential edge and coupled to the first circumferential edge. The radially expandable tube member includes a hollow interior. The wellbore patching system includes a deployment tool including: a tool body; and a restraining device coupled to the tool body and configured to prevent radial expansion of the tube member when the tool body is positioned within the hollow interior of the tube member and the restraining device is applied to the tube member. The first circumferential edge is bent to form a first hook, the second circumferential edge is bent to form a second hook, and the first circumferential edge is coupled to the second circumferential edge by the first hook engaging the second hook.

18 Claims, 14 Drawing Sheets

(56) References Cited

U.S. PATENT DOCUMENTS

| | | | |
|---|---|---|---|
| 6,675,901 B2* | 1/2004 | Johnson | E21B 17/20 |
| | | | 166/380 |
| 7,380,595 B2 | 6/2008 | Wetzel et al. | |
| 8,567,491 B2 | 10/2013 | Lurie | |
| 10,584,564 B2 | 3/2020 | Sherman | |
| 11,261,678 B2 | 3/2022 | Li et al. | |
| 11,346,188 B2 | 5/2022 | Affleck et al. | |
| 11,454,071 B2 | 9/2022 | Li et al. | |
| 2002/0195157 A1* | 12/2002 | Foti | F16L 11/16 |
| | | | 138/135 |
| 2003/0015247 A1 | 1/2003 | Driver et al. | |
| 2006/0130922 A1 | 6/2006 | Kamiyama et al. | |
| 2009/0178809 A1 | 7/2009 | Jeffryes et al. | |
| 2011/0120732 A1 | 5/2011 | Lurie | |
| 2015/0219253 A1* | 8/2015 | Clements | B31B 70/26 |
| | | | 138/121 |
| 2015/0337617 A1 | 11/2015 | McBride | |
| 2018/0274312 A1 | 9/2018 | Zhou | |
| 2019/0049054 A1* | 2/2019 | Gunnarsson | F16L 55/1656 |
| 2021/0164329 A1 | 6/2021 | Affleck et al. | |

FOREIGN PATENT DOCUMENTS

| | | |
|---|---|---|
| GB | 2357305 | 6/2001 |
| WO | WO 03042495 | 5/2003 |
| WO | WO 2019023413 | 1/2019 |
| WO | WO 2019027830 | 2/2019 |

\* cited by examiner

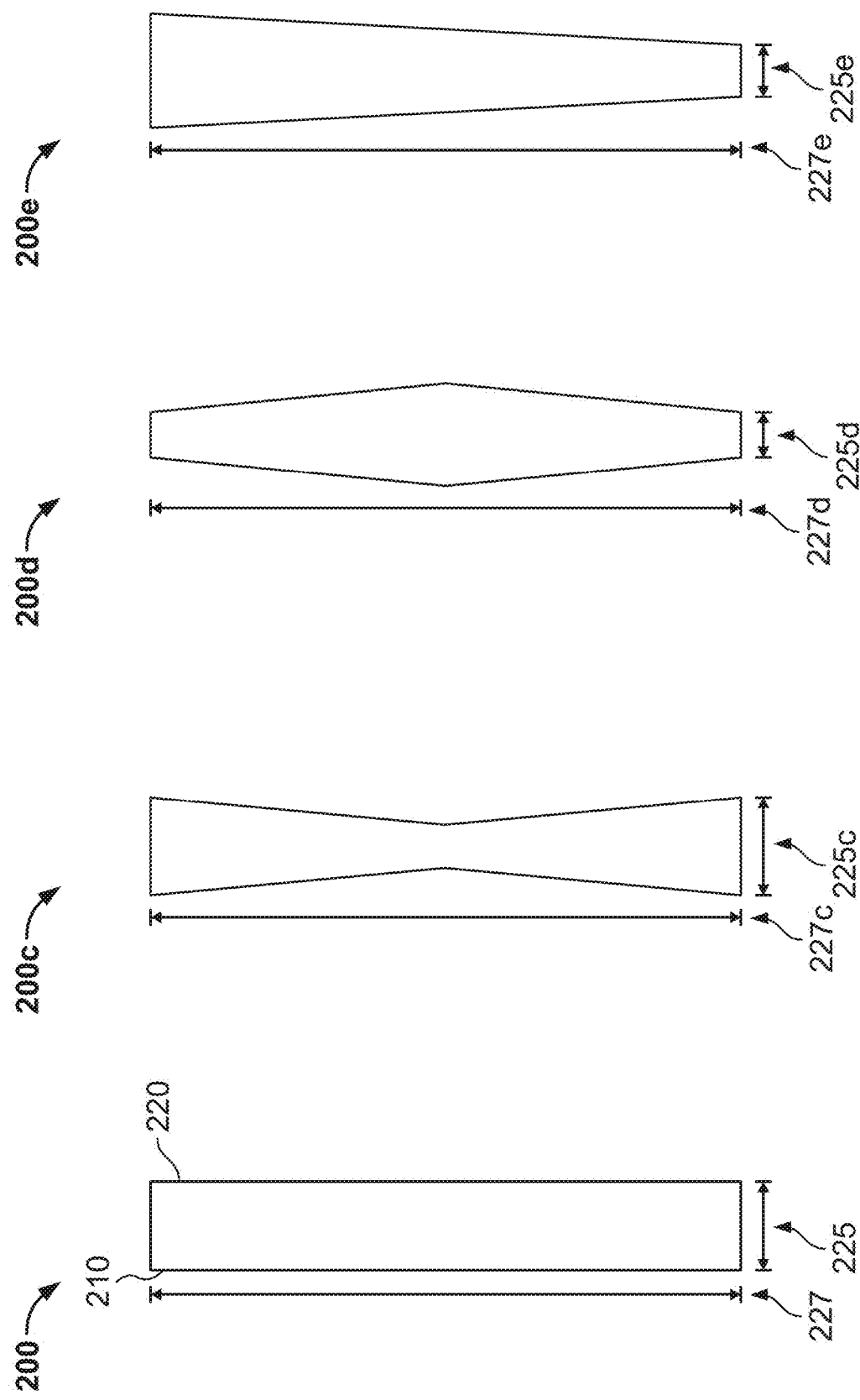

EXPANDABLE WELLBORE LOSS CONTROL PATCH

TECHNICAL FIELD

The present disclosure relates to wellbore loss control in oil and gas applications.

BACKGROUND

A drill rig can be used to drill a wellbore for oil and gas. A drill bit is used to cut the rock. The drill bit is coupled to a drill string or coil that is suspended from the rig at a terranean surface. Drilling fluid (e.g., mud) is pumped from surface to cool and lubricate the bit and to remove cuttings from the well. The vertical fluid column height generates a hydrostatic pressure at depth, which can be used to manage and control the inflow of hydrocarbons from the exposed rock formation into the wellbore.

Formation openings and voids can be uncovered while drilling. This can cause a loss of fluid from the wellbore. Any loss of fluid can change the mud vertical height and therefore the hydrostatic pressure at depth. Pressure changes can affect the management and control of the inflow of hydrocarbons. A blowout or loss of pressure control can occur when the inflow of hydrocarbons is uncontrolled.

SUMMARY

The present disclosure describes methods, devices, systems, and techniques for deploying a loss control patch to reduce the loss of drilling fluid during drilling operations. The technology relates to a loss control patch for plugging formation openings. A patch includes an expandable helically wound tube of material. The tube can be formed from a single sheet or multiple sheets of material interlocked at the sheet edges. The patch is attached to a deployment tool for delivery into a wellbore. The tool prevents the patch from expanding when the patch is attached to the tool. After the tool and patch are inserted into the wellbore, the patch is released and expands elastically in the wellbore, increasing in diameter. The expanded patch restricts fluid outflow at the porous zone of the wellbore. Multiple overlapping patches can be deployed in a single wellbore.

In an example implementation, a wellbore patch includes: a radially expandable tube member, including: a sheet wrapped in a spiral, the sheet including: a first circumferential edge; and a second circumferential edge opposite the first circumferential edge and coupled to the first circumferential edge; and a hollow interior.

In an aspect combinable with the example implementation, the first circumferential edge is bent to form a first hook, the second circumferential edge is bent to form a second hook, and the first circumferential edge is coupled to the second circumferential edge by the first hook engaging the second hook.

In another aspect combinable with one, some, or all of the previous aspects, the first hook is bent towards a radial center of the tube member; and the second hook is bent away from the radial center of the tube member.

In another aspect combinable with one, some, or all of the previous aspects, the coupling between the first circumferential edge and the second circumferential edge is configured to permit relative motion between spiraled turns of the sheet in a circumferential direction and is configured to prohibit relative motion between the spiraled turns of the sheet in a longitudinal direction.

In another aspect combinable with one, some, or all of the previous aspects, radial expansion of the tube member causes longitudinal compression of the tube member.

In another aspect combinable with one, some, or all of the previous aspects, longitudinal expansion of the tube member causes radial compression of the tube member.

In another aspect combinable with one, some, or all of the previous aspects, radial expansion of the tube member is a result of elastic unfurling of the sheet.

In another example implementation, a wellbore patching system including: a radially expandable tube member, including: a sheet wrapped in a spiral, the sheet including: a first circumferential edge; and a second circumferential edge opposite the first circumferential edge and coupled to the first circumferential edge; and a hollow interior; and a deployment tool including: a tool body; and a restraining device coupled to the tool body and configured to prevent radial expansion of the tube member when the tool body is positioned within the hollow interior of the tube member and the restraining device is applied to the tube member.

In an aspect combinable with the example implementation, the restraining device includes a fastener configured to attach to the tube member.

In another aspect combinable with one, some, or all of the previous aspects, the restraining device includes a sleeve configured to slide over a portion of the tube member.

In another aspect combinable with one, some, or all of the previous aspects, the first circumferential edge is bent to form a first hook, the second circumferential edge is bent to form a second hook, and the first circumferential edge is coupled to the second circumferential edge by the first hook engaging the second hook.

In another aspect combinable with one, some, or all of the previous aspects, the first hook is bent towards a radial center of the tube member; and the second hook is bent away from the radial center of the tube member.

In another aspect combinable with one, some, or all of the previous aspects, the coupling between the first circumferential edge and the second circumferential edge is configured to permit relative motion between spiraled turns of the sheet in a circumferential direction and is configured to prohibit relative motion between spiraled turns of the sheet in a longitudinal direction.

In another example implementation, a method for deploying a wellbore patch includes: positioning a tool body of a deployment tool within a hollow interior of a tube member, the tube member including: a sheet wrapped in a spiral, the sheet including: a first circumferential edge; and a second circumferential edge opposite the first circumferential edge and coupled to the first circumferential edge; and a hollow interior; applying a restraining device of the deployment tool to the tube member. The restraining device is coupled to the tool body and is configured to prevent radial expansion of the tube member. The method includes inserting the deployment tool and the tube member into a wellbore; releasing the restraining device from the tube member to radially expand the tube member; and removing the deployment tool from the wellbore.

In an aspect combinable with the example implementation, positioning the deployment tool within the hollow interior of the tube member includes wrapping the sheet around the tool body.

In another aspect combinable with one, some, or all of the previous aspects, applying the restraining device to the tube member includes attaching a fastener to the tube member.

In another aspect combinable with one, some, or all of the previous aspects, releasing the restraining device from the tube member includes detaching the fastener from the tube member.

In another aspect combinable with one, some, or all of the previous aspects, applying the restraining device to the tube member includes sliding a sleeve over a portion of the tube member.

In another aspect combinable with one, some, or all of the previous aspects, releasing the restraining device from the tube member includes sliding the sleeve to uncover the tube member.

In another aspect combinable with one, some, or all of the previous aspects, radial expansion of the tube member is a result of elastic unfurling of the sheet.

Implementations of the present disclosure can provide one or more of the following technical advantages. For example, the techniques described herein can reduce the amount of fluid loss due to formation openings in a wellbore, reducing the amount of fluid needed and thus improving efficiency of drilling operations. The wellbore loss control patch can improve wellbore safety and can reduce the risk of equipment damage by reducing the likelihood of a loss of pressure control or blowout.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3B-3E illustrate example unspiraled sheets.

It is to be understood that the various exemplary implementations shown in the figures are merely illustrative representations and are not necessarily drawn to scale.

DETAILED DESCRIPTION

Figure 1:
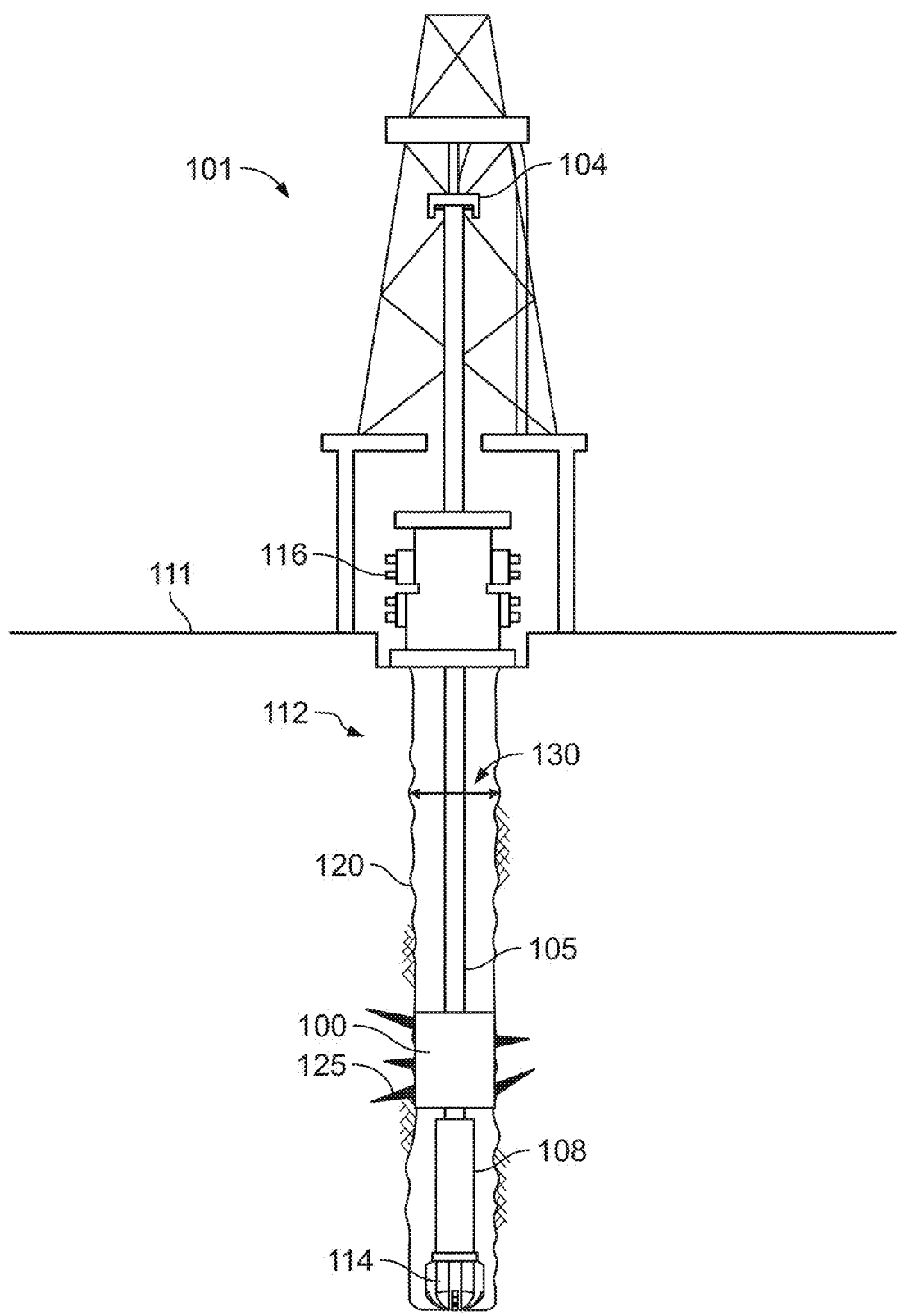
FIG. 1 illustrates an example wellbore system.

FIG. 1 illustrates an example wellbore system 101. The wellbore 120 is formed into a naturally subterranean formation (or reservoir) containing of one or more hydrocarbon fluids. The subterranean formation that holds the hydrocarbon fluid(s) can be present beneath several other formation rock layers.

A drilling assembly 112 can be used to form the wellbore 120 extending from a terranean surface 111 and through one or more geological formations in the Earth to reach subterranean formations located under the terranean surface 111. The drilling assembly 112 can include a top drive 104, a blowout preventer 116, a drill string 105, a bottom hole assembly 108, and a drill bit 114.

In some implementations, a drilling assembly 112 can be deployed on a body of water rather than the terranean surface 111. For instance, in example implementations, the terranean surface 111 can be an ocean, gulf, sea, or any other body of water under which hydrocarbon-bearing formations can be found. Reference to the terranean surface 111 includes both land and water surfaces and contemplates forming and developing one or more wellbore systems 101 from either or both locations.

Drilling fluid is pumped from the terranean surface 111 to cool and lubricate the drill bit 114 and to remove cuttings from the wellbore 120. The vertical fluid column height generates a hydrostatic pressure at depth, which can be used to manage and control the inflow of hydrocarbons from the exposed formation into the wellbore.

Formation openings and voids 125 can be uncovered while drilling. This can cause a loss of fluid from the wellbore 120. Any loss of fluid can change the mud vertical height and thus the hydrostatic pressure at depth. Pressure changes can affect the management and control of the inflow of hydrocarbons. A blowout or loss of pressure control can occur when the inflow of hydrocarbons is uncontrolled.

The introduction of additional mud can be required into the wellbore while losses are occurring. This mud is introduced at surface and can be continuously added to help maintain a sufficient fluid column height. Mud can be time consuming to mix or prepare and can be of limited supply. Severe mud losses can be costly, time consuming, to address and can pose hazards to personnel, assets, and infrastructure.

Loss Control Material (LCM) can be deployed to at least partially plug the voids 125. An example LCM includes a particulate or granular media. The LCM bridges and consolidates around and across the voids, helping to stem and reduce fluid losses. However, the voids 125 can be sufficiently large that LCM are unable to stem the fluid outflow.

A wellbore patch 100 can be run to depth and unfurled at the loss zone where the voids 125 are located. The wellbore patch 100 is expandable to the open hole diameter 130 and spans across porous zones in order to stem outflow. Sealing can then be supplemented with traditional LCM, which can now bridge and plug any remaining small gaps more effectively. In some cases, the wellbore patch 100 can be cemented in place to be left permanently in the well.

In some examples, the drill bit 114 is removed from the wellbore 120 prior to deploying the wellbore patch 100. The wellbore patch 100 can reduce the effective wellbore diameter, preventing the same sized drill bit 114 from being used before and after installing the wellbore patch 100. For example, the gauge diameter of the drill bit 114 might not pass through the slightly smaller bore of the wellbore patch 100. In some cases, after installing the wellbore patch 100, drilling can resume with a slightly smaller drill bit that can pass through the deployed wellbore patch 100.

In some cases, an expanding reamer or similar tool can be used to expand the diameter of the wellbore patch 100 so that the same drill bit 114 can be used before and after deploying the wellbore patch 100. The reamer can locally mill the formation and increase the wellbore diameter such that the deployed wellbore patch 100 expands to a new diameter larger than the original open hole diameter 130. The reamer can then be collapsed, allowing the reamer to pass back through the original open hole diameter when the drill string is recovered to surface. This process of increasing the unfurled wellbore patch 100 diameter can allow the same sized drill bit 114 to be deployed when drilling resumes.

Figure 2A:
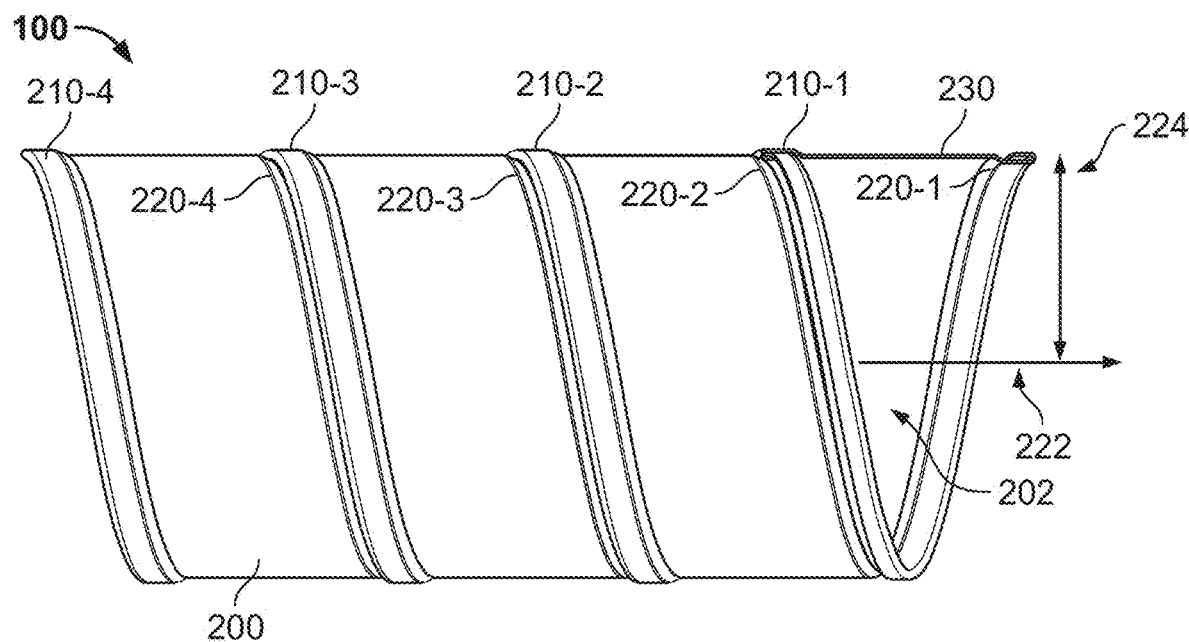
FIG. 2A shows an external side view of a portion of an example wellbore patch.
Figure 2B:
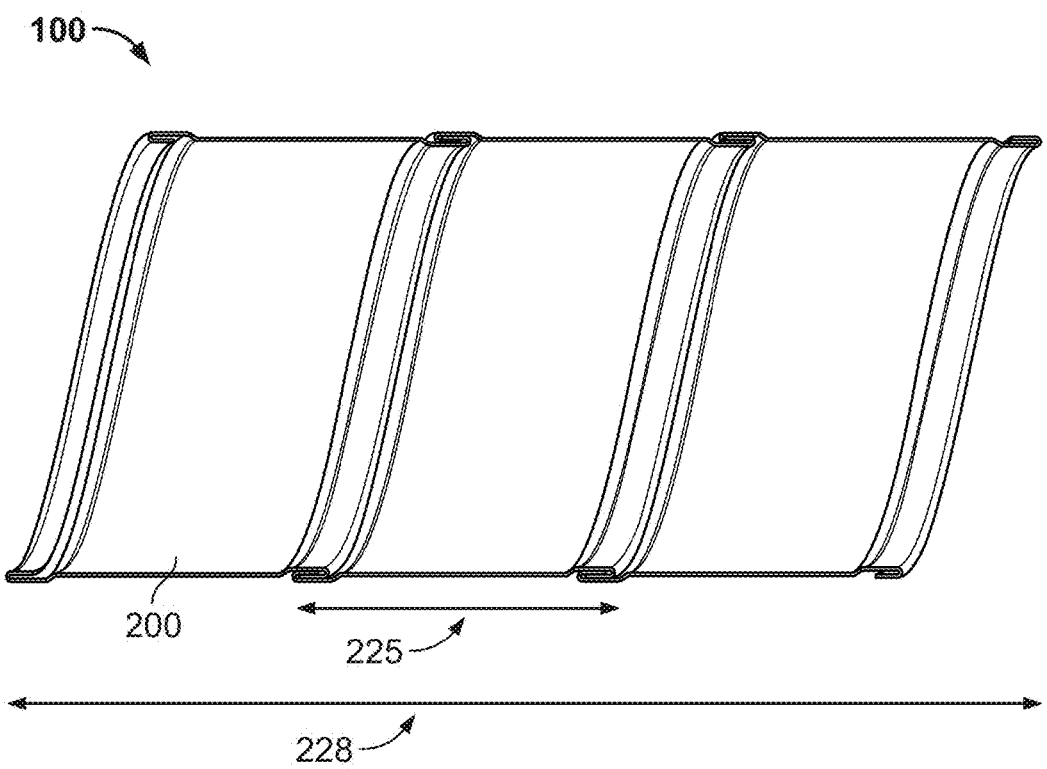
FIG. 2B shows a cross-sectional view of the portion of the example wellbore patch.

FIG. 2A shows an external side view of a portion of an example wellbore patch 100. FIG. 2B shows a cross-sectional view of the portion of the example wellbore patch 100. The patch 100 is a radially expandable tube member formed from a sheet 200 wrapped in a spiral or helix. The wrapped sheet 200 can have multiple turns, with each turn of the spiral adjacent to another turn such that the sheet 200 forms a tubular shape and defines a hollow interior 202.

In the illustrated example, the sheet 200 includes two circumferential edges. A circumferential edge is an edge of the sheet that extends around a circumference of the spiral. A first edge 210 and a second edge 220 are opposite from each other. At each turn of the spiral, the second edge 220 is coupled to the first edge 210 at an adjacent turn. For example, the second edge 220 has a starting point 220-1 of a first turn. The first edge 210 has a starting point 210-1 of the first turn. The second edge 220 has a starting point 220-2 of a second turn. The starting point 220-2 of the second turn for the second edge 220 is coupled to the starting point 210-1 of the first turn for the first edge 210. Similarly, a starting point 220-3 of the third turn for the second edge 220 is coupled to a starting point 210-2 of the second turn for the first edge 210.

The patch 100 has a radius 224 that defines a radial direction extending from the axis 222 to the sheet 200. The patch 100 has a tubular axis 222 that defines an axial direction, or longitudinal direction. The patch 100 has a length 228 in the longitudinal direction. The sheet 200 has a width 225 in the longitudinal direction. The width 225 is a distance between the first edge 210 and the second edge 220.

As shown in this example, the patch has a longitudinal edge 230 that connects the starting point 220-1 of the first turn of the second edge 220 with the starting point 210-1 of the first turn of the first edge 210. In some examples, the edge 230 is coupled with a longitudinal edge of a second spiraled sheet (not shown), such that the sheet 200 and the second sheets are attached end-to-end. Attaching multiple sheets end-to-end increases the length 228 of the patch 100. In this example, a circumferential edge of the second sheet can be coupled to the second edge 220-1 of the sheet 220-1 between the starting point 220-1 and the starting point 220-2. In some examples, the edge 230 is not coupled with another sheet, and the edge 230 is the end point of the patch 100.

The length 228 and the radius 224 of the patch 100 are variable and dependent on each other. The patch 100 can be tightened by extending the length 228 of the patch 100, causing the radius 224 to decrease. The patch 100 can be slackened by unfurling the patch 100, causing the radius 224 to increase and causing the length 228 to decrease.

The coupling between the first edge 210 and the second edge 220 permits the spiraled sheet 200 to tighten and unfurl by allowing the edges to freely slide past each other. The coupling can prevent the edges 210, 220 from moving in one or more degrees of freedom (e.g., radial, tangential, axial, or the associated rotations about each). In some examples, the coupling between the first edge 210 and the second edge 220 permits relative motion between spiraled turns of the sheet 200 in the circumferential direction. In some examples, the coupling between the first edge 210 and the second edge 220 prohibits relative motion between the spiraled turns of the sheet 200 in the longitudinal direction. The coupling can prevent the turns of the sheet 200 from separating from each other in the longitudinal direction.

The edges 210, 220 can include features that enable coupling between the edges. In some examples, the coupling features of the edges 210, 220 are formed from the sheet 200. The features can be formed, for example, by bending, rolling, and/or indenting the edges of the sheet 200. In some examples, the features include hooks.

Figure 3A:
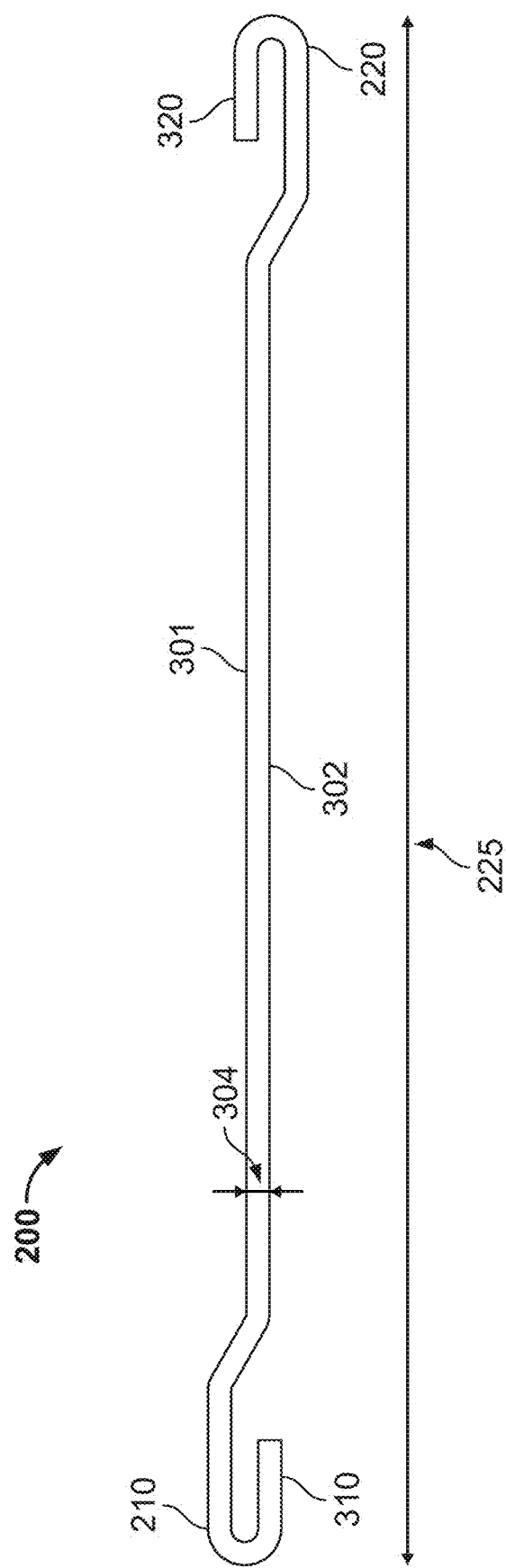
FIG. 3A shows a longitudinal edge view of an example unspiraled sheet.

In some examples, the first edge 210 is bent to form a first hook, and the second edge 220 is bent to form a second hook. For example, FIG. 3A shows a longitudinal edge view of the example sheet 200 unfolded (e.g., unspiraled). The sheet 200 includes a first hook 310 at the first edge 210 and a second hook 320 at the second edge 220. The first edge 210 couples to the second edge 220 by the first hook 310 engaging the second hook 320 when the sheet 200 is wrapped in a spiral.

The first hook 310 is bent in a first direction, and the second hook 320 is bent in an opposite direction. For example, referring back to FIG. 3A, the first hook 310 at the first edge 210 bens towards a radial center of the patch 100, and the second hook 320 at the second edge 220 is bent away from the radial center of the patch 100.

In some examples, the coupling features (e.g., hooks 310, 320) are integral with the sheet 200 and are formed from the sheet material. In some examples, the coupling features of the edges 210, 220 are formed separately from the sheet 200 and are attached to the sheet 200. The coupling features can include, for example, hooks or fasteners that are bonded, glued, or welded to the edges 210, 220.

The sheet 200 includes a first side 301 and a second side 302. When the sheet 200 is wrapped in a spiral, or helix, one of the first side 301 or the second side 302 faces inward toward the radial center of the patch 100, and the opposite side faces outwards away from the radial center of the patch 100. The side that faces outward is the side that contacts the sides of the wellbore 120 when the patch 100 is deployed.

In some examples, the sheet 200 is reversible such that either the first side 301 or the second side 302 can face outward when the sheet 200 is wrapped in a spiral. For example, the first side 301 and the second side 302 can have the same properties, features, and/or characteristics.

In some examples, the sheet 200 is not reversible, and only one of the first side 301 or the second side 302 can face outward when the sheet 200 is wrapped in a spiral. For example, the first side 301 and the second side 302 can have different properties, features, and/or characteristics. As an example, the first side 301 can include features that are configured to increase grip against the wellbore and to resist axial movement. The features can include, for example, knurling, chevrons, pips, studs, and serration. In contrast, the second side 302 may be smooth. In this example, the sheet 200 is wrapped in a spiral such that the first side 301 faces outwards and will engage the sides of the wellbore when the patch 100 is deployed.

A distance between the first side 301 and the second side 302 is a thickness 304 of the sheet 200. A greater thickness 304 increases the pressure capacity of the patch 100 and decreases the flexibility of the patch 100. A lesser thickness 304 decreases the pressure capacity of the patch 100 and increases the flexibility of the patch 100. The maximum thickness 304 may therefore be limited by the material of the patch 100 and the radius 224 of the patch 100.

Pressure capacity of a patch 100 can be increased by using multiple discrete patch layers. For example, two or more patches can be inserted into a wellbore arranged coaxially with each other.

The interlocking edges of the sheet can prevent one spiraled sheet turn from radially expanding or tightening further than adjacent turns on either side. Thus, the spiraled sheet 200 can remain nominally tubular and/or cylindrical throughout its unfurling and tightening range. This can be advantageous if the spiraled sheet 200 unfurls inside an irregular shaped hole because the spiraled sheet 200 with interlocking edges expands all turns together without edge gaps.

The wellbore patch 100 can be formed from any suitable material. The wellbore patch 100 can include metallic material (e.g., memory metal, bimetallic material, clad metallic material). The wellbore patch 100 can include plastic (e.g., nylon, polyetheretherketone (PEEK), Acrylonitrile Butadiene Styrene (ABS)). The wellbore patch 100 can include composite (e.g., fiberglass, carbon fiber reinforced plastic, aramid reinforced plastic, glass filled plastic, epoxy impregnated cloth, glass filled plastic, laminated material). The wellbore patch 100 can include any combination material, metamaterial, or hybrid material (e.g., metal wires within fiberglass, aramid reinforced carbon fiber, plastic encapsulated steel, Polytetrafluoroethylene (PTFE) coated metal, syntactic foam, rubber overlay covering a metal, carbon fiber over a metal, metallic wrap with extrusion molded plastic strip edges, epoxy bonded to metal, laminar structure of plastic and metal.

The materials of the wellbore patch 100 can be selected such that the materials provide sufficient strength, stiffness, and elasticity, provide corrosion resistance, provide adhesion or sealing between layer edges, provide adhesion or sealing around the inner and/or outer diameters of the patch 100, reduce friction between edges, and/or provide sufficient buoyancy, weight, and density.

The wellbore patch 100 can include features that improve the strength, stability, and void-sealing ability of the patch 100. In some examples, the sheet 200 includes ribs or corrugations to add stiffness and increase collapse resistance.

In some examples, the sheet 200 includes gripping features to increase grip against the formation and prevent slipping in axial and radial directions. Gripping features can include, for example, dimples, knurling, hatching, indentations, pips, pins, knurling, chevrons, studs, serrations, and teeth. In some examples, a surface of the sheet 200 includes a high grip material such as rubber or embedded grit.

The gripping features can be located on both sides of the sheet 200, or on one side of the sheet 200. In some examples, the gripping features are located on a side of the sheet 200 that faces outward in a radial direction when the sheet 200 is wrapped in a spiral. In some examples, the gripping features are embossed onto the sheet 200. In some examples, the gripping features are attached to the sheet 200 (e.g., by welding, threading, bonding).

In some examples, an outer surface of the sheet 200 includes or is coated with a flexible material. The flexible material can be, for example, a pliable elastomer or a similarly soft material. The flexible material can deform to accommodate irregular shapes of the wellbore. In some examples, the flexible material is a swellable material that increases in volume on sustained contact with a particular fluid. The use of a flexible material can improve sealing, reduce gaps and clearances, and improve the ability of the patch 100 to stem fluid outflow.

In some examples, the patch 100 includes a fibrous, porous, or sponge-like material that conforms to the wellbore shape. The fibrous material can entrain and catch LCM or granular media in the pores or fibers.

In some examples, the sheet 200 includes notches, serrations, flaps, and/or tabs that permit the edges of the patch 100 to slide relative to each other in one direction, and prevent the edges of the patch 100 from sliding relative to each other in an opposite direction. For example, the sheet 200 can include notches that permit the edges of the patch 100 to slide relative to each other to unfurl the patch 100, and prevent the edges of the patch 100 from sliding relative to each other to collapse the patch 100. In this example, after the patch 100 is radially expanded, the patch 100 cannot radially collapse.

The sheet 200 has a width 225 from the first edge 210 to the second edge 220. Referring to FIG. 3B, the sheet 200 has a sheet length 227 in a direction orthogonal to the width 225. The width 225 of the sheet 200 is constant along the sheet length 227. In some examples, the hooks 310, 320 are continuous along the sheet length 227.

Figure 4:
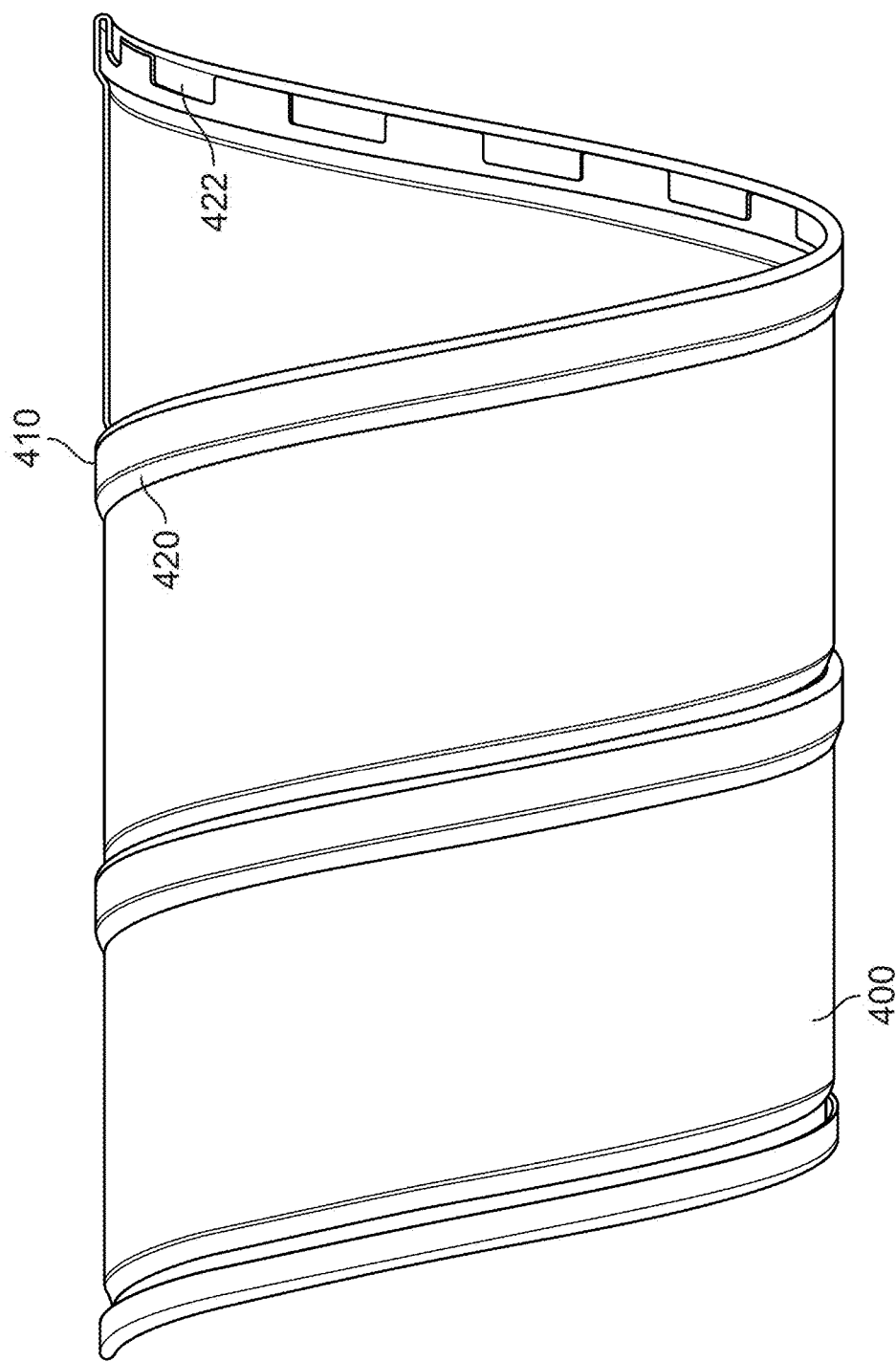
FIG. 4 illustrates an example wellbore patch with non-continuous coupling features.

In some examples, the hooks 310, 320 are non-continuous along the sheet length 227. For example, referring to FIG. 4, a sheet 400 includes edges 410, 420 with non-continuous coupling features 422. The non-continuous coupling features 222 include hooks that are spaced apart from each other along the sheet length. Spacing the hooks apart from each other can facilitate assembly and disassembly, and can increase debris and dirt tolerance. For example, debris that is caught between the sliding edges 410, 420 can be displaced and exit through the spaces between the hooks, thereby reducing friction between the sliding edges 410, 420 and improving the ability of the patch to furl and unfurl.

In some examples, the width 225 varies along a sheet length. For example, referring to FIG. 3C, a sheet 200c has a width 225c that varies along a sheet length 227c. The width 225c decreases from ends of the sheet length 227c towards a center of the sheet length 227c, and increases from the center towards the ends of the sheet length 227c.

Referring to FIG. 3D, a sheet 200d has a width 225d that varies along a sheet length 227d. The width 225d increases from ends of the sheet length 227d towards a center of the sheet length 227d, and decreases from the center towards the ends of the sheet length 227d.

In some examples, a sheet can have a width 225 that increases or decreases from one end of the length of the sheet to an opposite end of the length of the sheet. For example, referring to FIG. 3E, a sheet 200e has a width 225e that increases from one end of the sheet length 227e to an opposite end of the sheet length 227e.

Interlocking edges between spiral turns can permit slight movement, particularly in bending of the patch 100 along the length 228 of the patch. Wellbore patch flexibility and minimum bend radius may be a maximum where coil pitch is a minimum. For example, an area of the patch having narrower sheet widths will have more spiral turns per unit length, compared to an area of the patch having wider sheet widths. A greater number of spiral turns per unit length increases the bending flexibility of the patch 100, while a reduced number of turns per unit length decreases the bending flexibility of the patch. Therefore, for a patch 100 formed form a sheet with variable width, the bending stiffness of the patch 100 is greatest at a portion of the patch width the greatest sheet width.

An example sheet 200 has a width 225 of 3.0 inches or more (e.g., 3.4 inches or more, 3.5 inches or more, 4.0 inches or more). A distance between the first side 301 and the second side 302 can be 1.0 inches or less (e.g., 0.8 inches or less, 0.5 inches or less, 0.4 inches or less).

An example patch 100 includes a sheet 200 having a constant width 225 of 3.0 inches. The example patch 100 has a radius 224 of 3.6 inches. Each turn of the spiraled sheet therefore uses approximately 23.0 inches of sheet length 227.

The wellbore patch 100 can be deployed with the spiraled sheet tightly wound to minimize its outer diameter and make the patch 100 easy to deploy into a wellbore 120 or restriction. The patch 100 can then be unfolded, or unfurled, at the location where the patch 100 is to be deployed. The unfurling causes the patch 100 to increase in diameter.

The patch 100 can elastically deform when tightened because the spiraled sheet 200 is being flexed to achieve the tighter curvature. The patch 100, when tightly wound, stores elastic energy. The patch 100 can be deployed in an energized state to elastically recover when restraints or supports are removed. The patch 100 can therefore automatically increase in diameter when freed from restraints.

In some examples, the spiraled sheet 200 can be mechanically unfurled. For example, the diameter of the wellbore 120 may exceed the elastic recovery range of the sheet 200, and further expansion may be needed in order to expand the patch 100 to reach the sides of the wellbore 120. In some examples, a mechanical tool can rotate one end of the wellbore patch 100 relative to the other in order to achieve the radial expansion. In some examples, a mechanical tool can exert an outwards radial force on the sheet 200 in order to forcibly expand the patch 100. In some examples, a mechanical tool can hydraulically inflate a bag or packer in the hollow interior 202 of the patch to forcibly expand the patch 100.

In some examples, the spiraled sheet is swaged to better conform to the wellbore. Swaging can be performed using the same expansion process or by a separate process after the patch 100 is at least partially unfurled. A swage tool can be used to forcibly dilate the patch 100. The resulting swaged patch 100 shape might not be cylindrical. For example, the resulting swaged patch 100 can be oval, tapered, or any irregular shape and can vary along the patch length 228. For example, a hydraulic inflation of a packer within the hollow interior 202 of the patch 100 can force the patch 100 to conform to a non-cylindrical wellbore. In some examples, swaging can lock the spiraled sheet 200 into its final shape. For example, swaging can be used to crush or crimp the overlapping edges 210, 220 to prevent further sliding after the patch 100 is deployed.

The patch 100 can include an adhesive on the overlapping edges 210, 220. The adhesive can cure over time, with temperature, on exposure to an activator, or any combination thereof. In some examples, the activator is automatically released from a deployment tool when the patch 100 is deployed from the deployment tool. In an example, resin from a two-part epoxy can be applied to the coupling features of the edges 210, 220 prior to deployment of the patch 100. A separate catalyst or activator can be released as the patch 100 expands in the wellbore. The catalyst in contact with the resin causes the glue to cure.

FIGS. 5A to 5E illustrate example steps of a sequence for deploying an externally housed wellbore patch. FIG. 6 illustrates a flow chart of an example process 600 for deploying an externally housed wellbore patch.

Figure 5A:
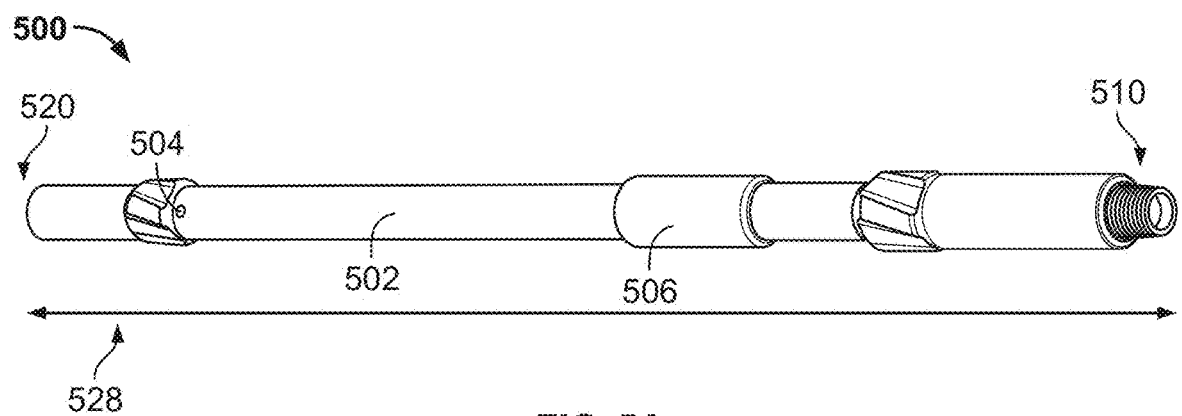
FIGS. 5A to 5E illustrate example steps of a sequence for deploying an externally housed wellbore patch.
Figure 6:
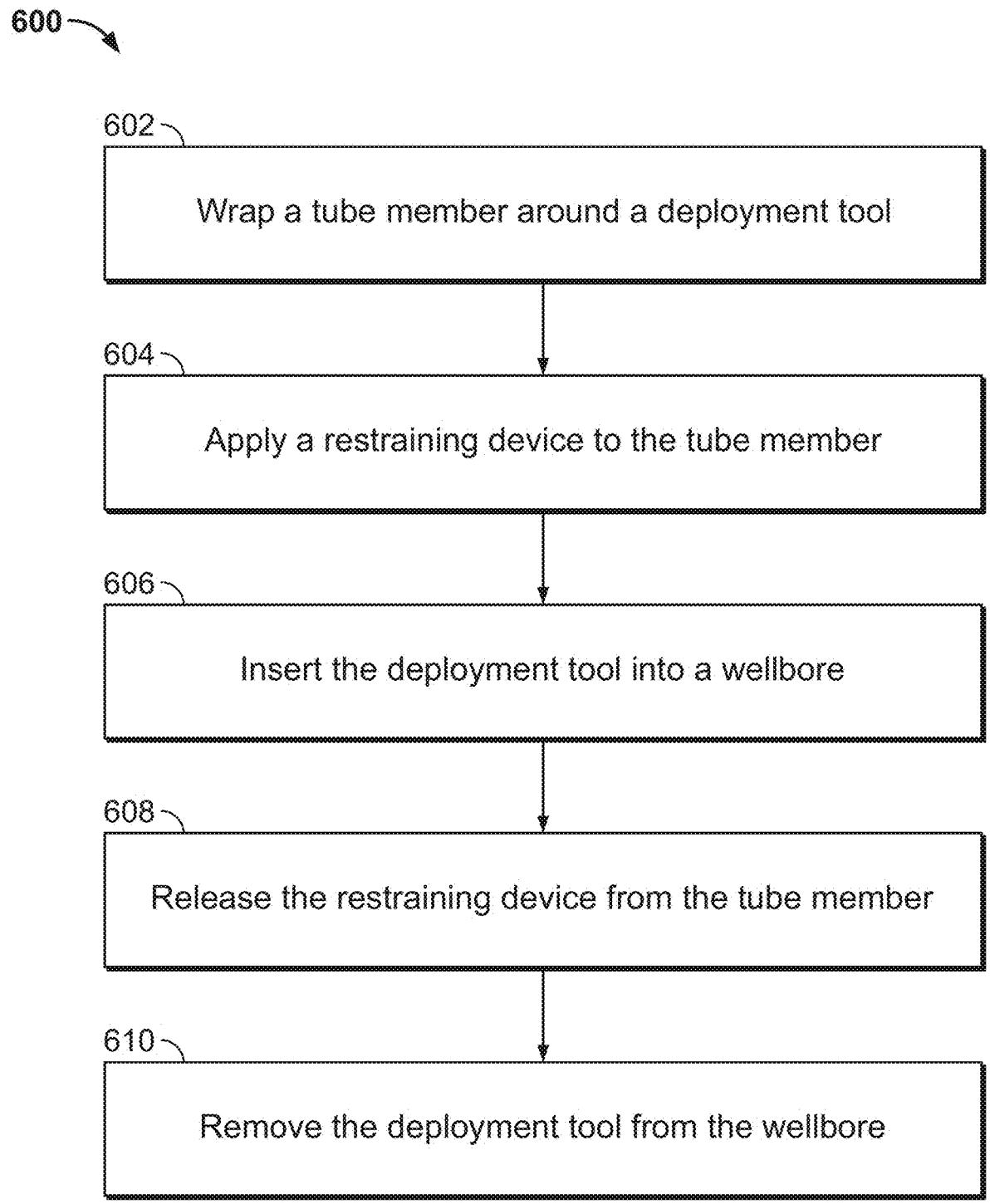
FIG. 6 illustrates a flow chart of an example process for deploying an externally housed wellbore patch.

Referring to FIG. 5A, a deployment tool 500 includes a tool body 502. The deployment tool 500 has a first end 510 and a second end 520 opposite the first end 510. When the deployment tool 500 is inserted into the wellbore 120, the first end 510 enters the wellbore 120 before the second end 520, such that the first end 510 is a bottom end and the second end 520 is a top end.

The deployment tool 500 has a length 528. The length 528 is a distance between the first end 510 and the second end 520. The length 528 can be, for example, forty feet or less (e.g., thirty-five feet or less, thirty feet or less, twenty-five feet or less) and four feet or more (e.g., six feet or more, eight feet or more, ten feet or more).

The process 600 includes wrapping a tube member around a deployment tool (602). For example, referring to FIG. 5B, the patch 100 can be loaded onto the deployment tool 500 by wrapping around the tool body 502 such that the tool body 502 is positioned within the hollow interior of the patch 100. In some examples, the patch 100 covers the entire tool body 502. In some examples, the patch covers part of the tool body 502.

In some examples, the deployment tool 500 can hold more than one patch 100. In some examples, two or more patches can be overlaid on the tool body 502. In some examples, the two or more patches can be connected to each other end-to-end.

The process 600 includes applying a restraining device to the tube member (604). The deployment tool 500 includes at least one restraining device that can be applied to the patch 100 when the patch is wrapped around the tool body 502. When the restraining devices are applied to the patch 100, the restraining device prevents radial expansion of the patch 100. Restraining devices of the deployment tool 500 include a fastener 504 and a sleeve 506.

The fastener 504 is a button, protrusion, or hook coupled to the tool body 502. The fastener is configured to removably attach to the patch 100. For example, the patch 100 can include an eyelet 505 and the fastener 504 can attach to the patch 100 by the fastener 504 being inserted through the eyelet 505. In some examples, the fastener 504 is attachable to the patch 100 at or near an end of the patch 100. For example, the eyelet 505 can be located at a part of the patch that is nearer to an end of the patch 100 than to a center of the patch 100 along the length 228 of the patch 100.

Figure 5B:
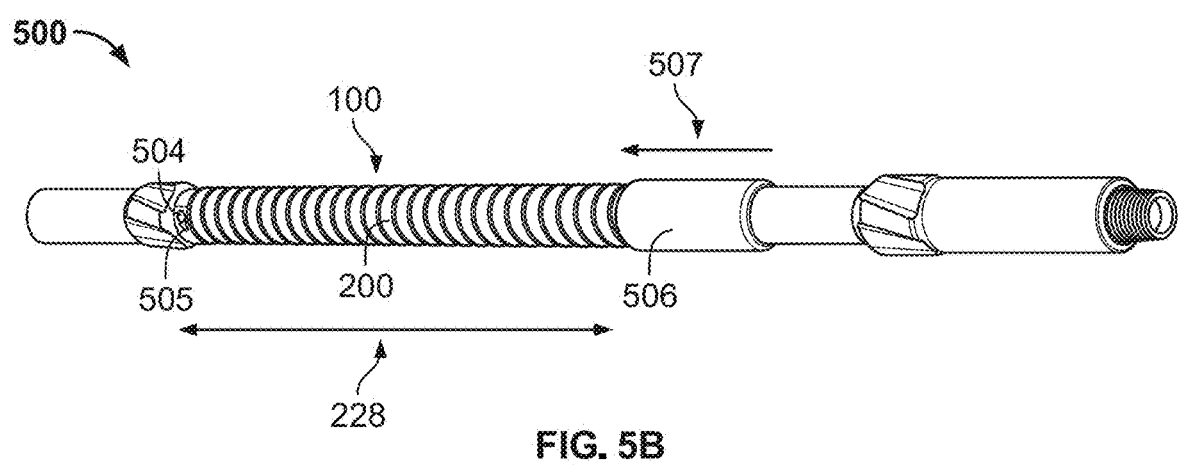
Figure 5C:
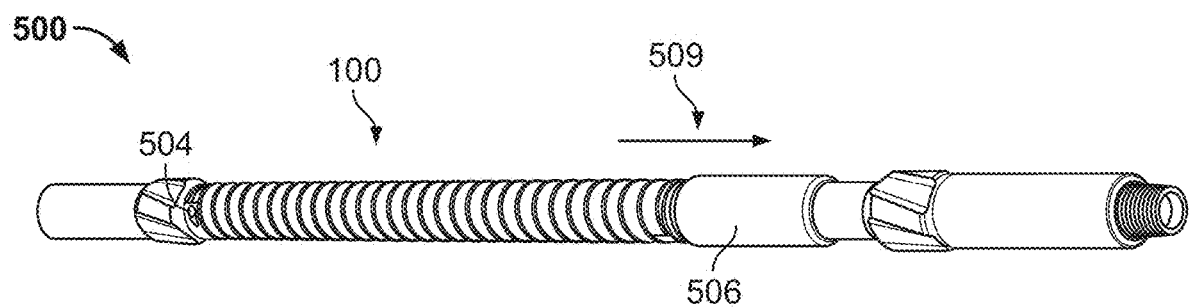

The sleeve 506 is configured to slide over at least a portion of the patch 100. In the example of FIG. 5B, the patch 100 is loaded into the deployment tool 500 by being wrapped tightly around the tool body 502. The sleeve 506 slides in a direction 507 to cover part of the patch 100. The sleeve 506 slides over a portion of the patch 100 at an end of the patch 100 along the length 228, and the fastener 504 attaches to the patch at an opposite end of the patch 100 along the length 228. The fastener 504 and the sleeve 506 prevent the ends of the patch 100 from radially expanding. Each turn of the spiral-wrapped sheet is coupled to an adjacent turn at the circumferential edges, such that each turn restrains the adjacent turn from unfurling.

Although shown as having the sleeve 506 nearer to the first end 510 and the fastener 504 nearer to the second end 520, other configurations of the deployment tool 500 are possible. For example, the sleeve 506 can be nearer to the second end 520 and the fastener 504 can be nearer to the first end 510. In some examples, the deployment tool 500 can include two sleeves or two fasteners.

In some examples, the deployment tool 500 and patch 100 can be included in a pre-fabricated kit. A kit can include the deployment tool 500 pre-loaded with the patch 100 wrapped around the tool body 502, and the fastener 504 and sleeve 506 restraining the patch 100. Multiple different kits can be provided with patches of varying sizes and/or material characteristics.

The process 600 includes inserting the deployment tool into a wellbore (606). For example, the deployment tool 500 with the loaded patch 100 can be inserted into the wellbore 120. The deployment tool 500 can be inserted into the wellbore by any appropriate method, such as on a drill string or oil. The deployment tool 500 can be positioned at a location of the wellbore 120 where fluid losses are occurring.

The process 600 includes releasing the restraining device from the tube member (608). For example, referring to FIG. 5C, when the deployment tool 500 is positioned at the fluid loss location, the patch 100 can be released from the deployment tool 500. For example, the sleeve 506 can slide in a direction 509 to uncover the patch 100.

The sleeve 506 can be moved in the direction 509 by any appropriate method. For example, the sleeve 506 can be activated by a dropped ball or dart. In some examples, movement of the sleeve 506 can be controlled by an electronic trigger, and RFID tag, wireless communication signals, and/or a timer. In some examples, the sleeve 506 is motion activated. For example, a rotation sequence of the deployment tool 500 can cause the sleeve 506 to activate and move to expose the patch 100. In some examples, the sleeve 506 is pressure activated. For example, a pressure pulse sequence can cause movement of the sleeve 506, or overpressure can be applied to shear an activation mechanism of the sleeve 506.

In some examples, the fastener 504 releases the patch 100. For example, the fastener 504 can be retracted into the tool body 502 to detach from the patch 100. In some examples, expansion of the patch 100 causes the patch 100 to detach from the fastener 504. For example, when the sleeve 506 is removed from the patch 100 and the patch 100 begins to unfurl, the eyelet 505 can lift off of the fastener 504.

Figure 5D:
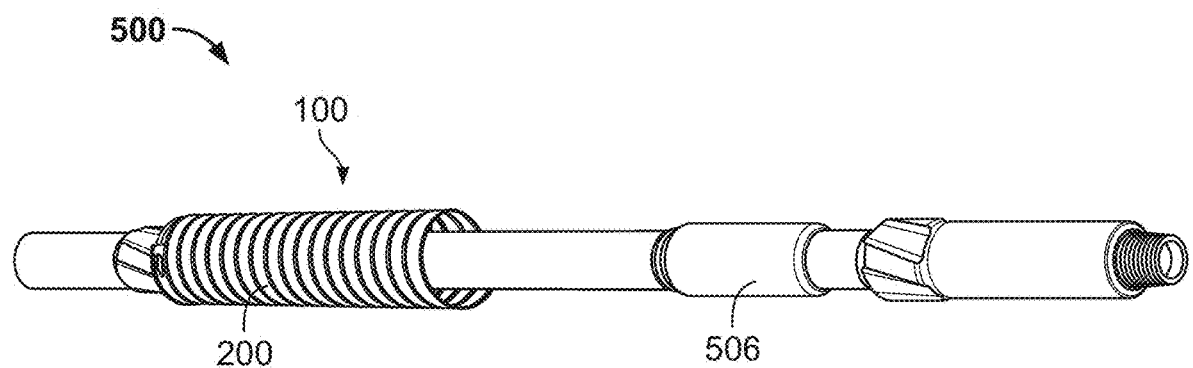

Referring to FIG. 5D, the sleeve uncovers the patch 100 and the patch 100 elastically expands in a radial direction. The patch 100 begins to unfurl. Radial expansion of the patch 100 is a result of elastic unfurling of the sheet 200. In some examples, the patch 100 retains sufficient elasticity to expand to the full diameter of the wellbore 120. In some examples, in addition to or instead of elastic unfurling, the sheet 200 can be mechanically unfurled as described above.

The deployment tool 500 can include pockets, recesses, or cavities to carry LCM internally or externally. This can allow large diameter LCM to be carried that might otherwise be impractical to flow through drillpipe circulation ports. The patch 100 can overlay and cover the pockets when the patch 100 is installed on the deployment tool 500. When the sleeve 506 slides away from the patch 100, unfurling of the patch uncovers the pockets, automatically releasing the LCM from the deployment tool 500. This can allow LCM to be spotted directly at the patch location. In some examples, LCM can seal gaps between and around the deployed patch 100. The LCM can fill gaps between the patch 100 and the wellbore formation. In some examples, movement of the sleeve 506 releases adhesive activator in addition to, or instead of, the LCM.

In some examples, the deployment tool has a continuous thru-bore. The LCM can be pumped directly through the thru-bore of the deployment tool 500 to exit into the wellbore 120 at the first end 510 of the deployment tool 500. In some examples, LCM can be pumped from the terranean surface 111 into the wellbore 120 through the same drill string or coil used to insert the deployment tool 500.

Figure 5E:
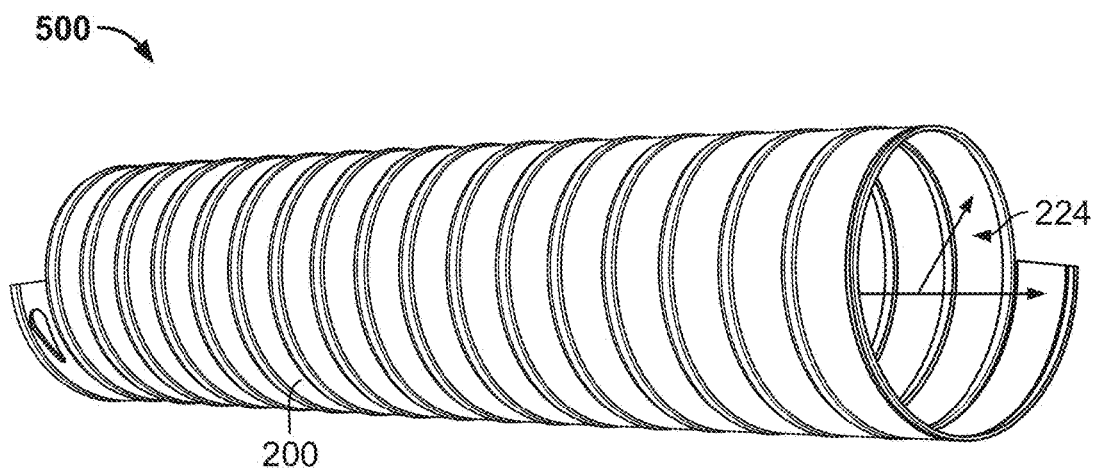

Referring to FIG. 5E, the patch 100 continues to expand. The radius 224 increases over time during expansion of the patch 100. During expansion, the patch 100 remains nominally cylindrical and continuous, without gaps opening between adjacent wrap layers of the spiral sheet 200. The wellbore 120 might not be cylindrical, therefore some portions of the patch 100 will contact the wellbore formation before other portions. The interlocking edges of the patch 100 prevent excessive expansion of any single patch layer. After expansion, the patch 100 is nominally adjacent to the wellbore formation and restricts outflow at the porous zone. The expanded spans across the gaps and covers formation voids and openings.

In some examples, the expanding patch 100 can be unsuspended and free to fall in the wellbore 120 as contact is lost with the deployment tool and before it forcibly contacts the wellbore. A temporary anchor, packer or support can be deployed to suspend the patch 100, ensuring the patch 100 expands without significant longitudinal movement while unfurling.

In some examples, a process for unfurling the spiraled sheet 200 can support the patch 100. For example, a mechanical swage tool, radial expanding tool, or inflating packer tool can maintain contact with the sheet 200 throughout the expansion, preventing the patch 100 from falling.

The process 600 includes removing the deployment tool from the wellbore (610). The expanded patch 100 is larger than the deployment tool 500 and approximates the open hole diameter of the wellbore 120. After the patch 100 releases from the deployment tool 500, the deployment tool 500 can be withdrawn through the hollow interior 202 of the patch 100, leaving behind the expanded patch 100 in the wellbore 120. In some examples, additional LCM can be deployed to seal remaining gaps.

In some examples, two or more patches can be loaded onto the deployment tool 500. For example, a first patch can be wrapped around the deployment tool 500 and a second patch can be wrapped around the first patch. The patches can be released simultaneously or sequentially.

Figure 7A:
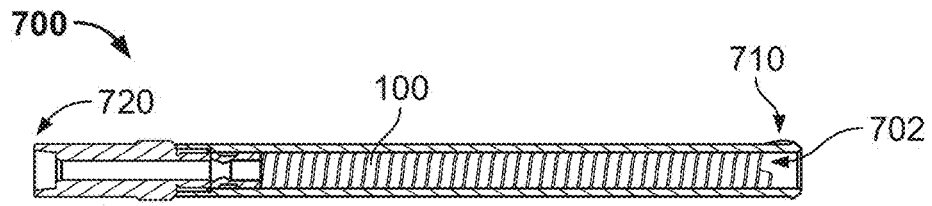
FIGS. 7A-7D illustrate example steps of a sequence for deploying an internally housed wellbore patch.
Figure 7B:
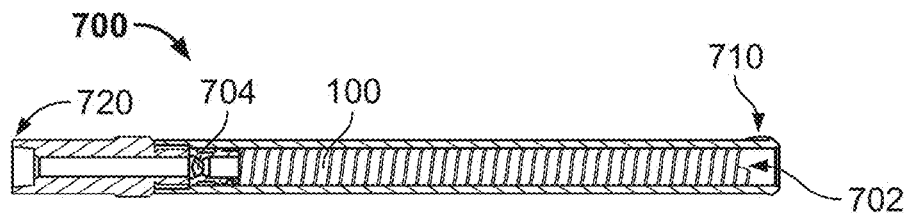
Figure 7C:
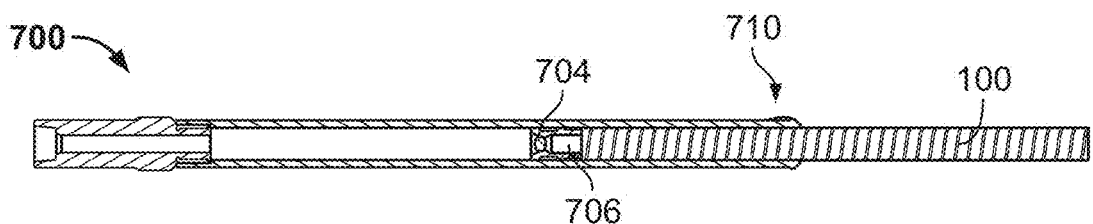

FIGS. 7A to 7D illustrate example steps of a sequence for deploying an internally housed wellbore patch. FIG. 8 illustrates a flow chart of an example process 800 for deploying an internally housed wellbore patch.

The process 800 includes inserting a wrapped tube member into a deployment tool cavity (802). For example, referring to FIG. 7A, a deployment tool 700 includes a cavity 702. The patch 100 can be wrapped in a spiral and loaded into the cavity 702. The deployment tool 700 has a first end 710 and a second end 720 opposite the first end 710. When the deployment tool 700 is inserted into the wellbore 120, the first end 710 enters the wellbore 120 before the second end 720, such that the first end 710 is a bottom end and the second end 720 is a top end.

The process 800 includes inserting the deployment tool into a wellbore (804). For example, the deployment tool 700 with the loaded patch 100 can be inserted into the wellbore 120. The deployment tool 700 can be inserted into the wellbore by any appropriate method, such as on a drill string or coil. The deployment tool 700 can be positioned at a location of the wellbore 120 where fluid losses are occurring.

The process 800 includes launching the wrapped tube member out of the deployment tool cavity (806). For example, referring to FIG. 7B, the release of the patch 100 can be activated by a dropped ball 704. In some examples, the release of the patch 100 can be activated by another method such as by dart activation.

When the ball 704 is dropped, the ball 704 lands on a sliding seat 706. Fluid is pumped from the terranean surface 111, and pressure builds behind the ball 704. Referring to FIG. 7C, the fluid pressure pushes the sliding seat 706 and patch 100 down the deployment tool 500 cavity 702 towards the first end 710. The patch 100 exits the open end of the cavity 702 into the wellbore 120.

Figure 7D:
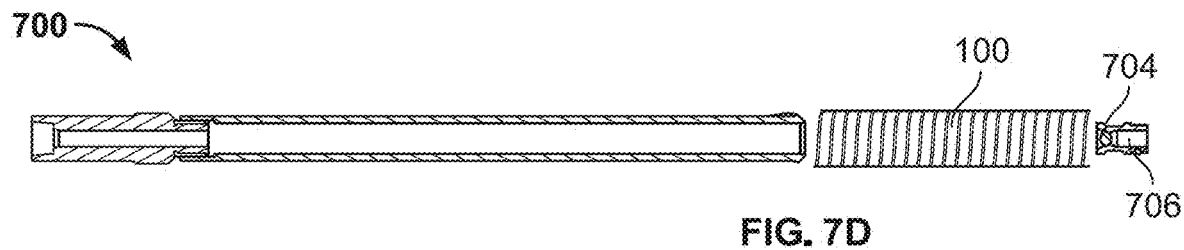
Figure 8:
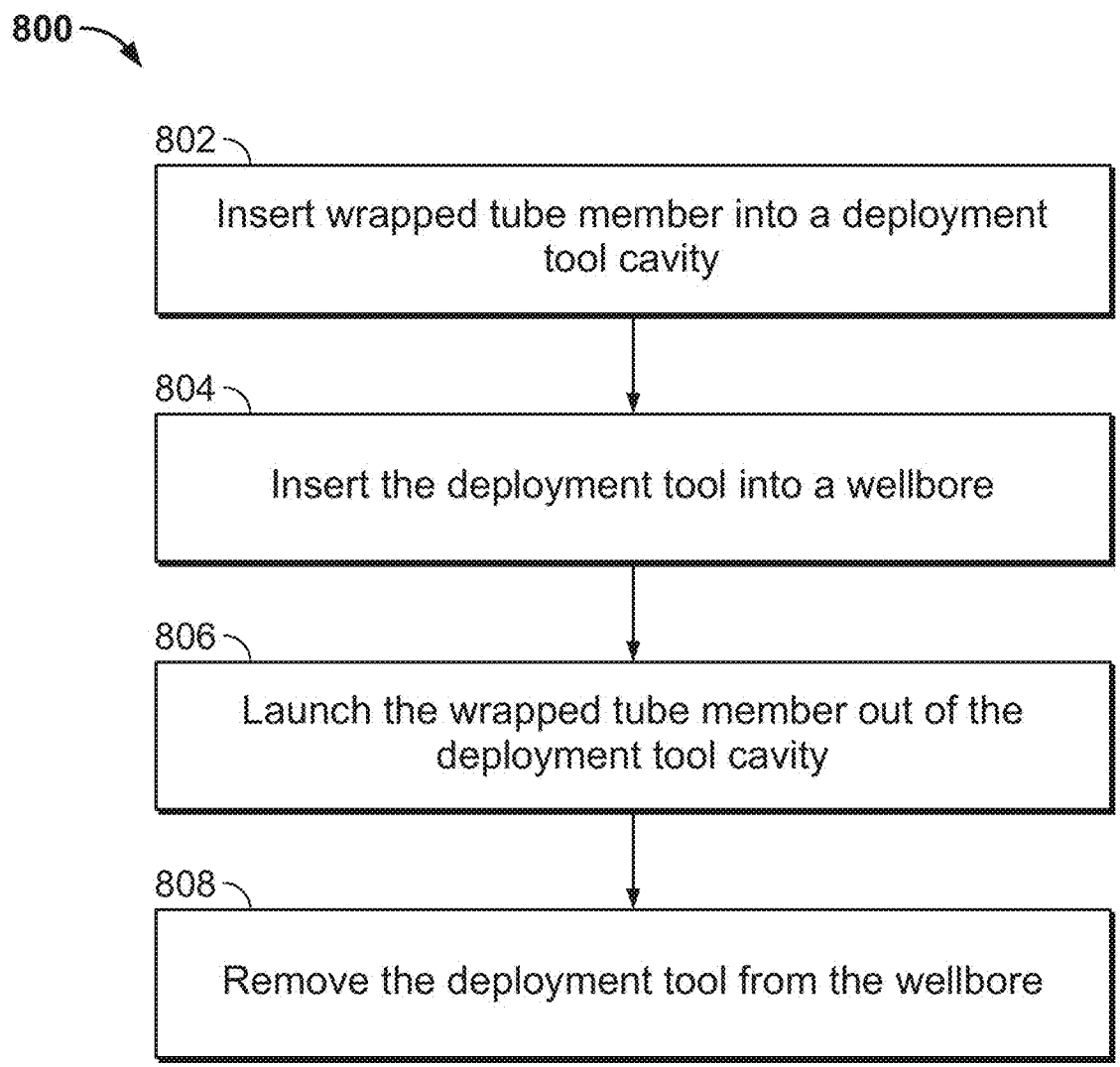
FIG. 8 illustrates a flow chart of an example process for deploying a wellbore patch from an internally housed deployment tool.

Referring to FIG. 7D, the patch 100 unfurls upon exiting the cavity 702 of the deployment tool 700. In some examples, the sliding seat 706 is ejected from the cavity 702 and is dropped into the well. The sliding seat 706 and/or ball 704 can be made from a dissolvable or easily milled material such as aluminum or plastic. In some examples, the sliding seat 706 can be captively retained within the cavity 702 instead of being ejected from the cavity 702.

The process 800 includes removing the deployment tool from the wellbore (808). For example, the deployment tool 700 can be removed from the wellbore 120 by the drill string or coil that inserted the deployment tool 700 into the wellbore 120.

Deployment of example implementations of externally housed wellbore patches, as shown in FIGS. 5A-5E and 6, and deployment of example implementations of internally housed wellbore patches, as shown in FIGS. 7A-7D and 8, each have certain advantages.

For an externally housed wellbore patch, an advantage is that there is a smaller expansion ratio between the radius of the patch when loaded on the deployment tool 500 and the radius of the patch 100 when unfurled. Another advantage is that the curvature of the wound patch is less severe, compared to an internally housed patch, and the patch 100 is therefore more likely to remain within the material elastic limits. In contrast, the internally housed patch is wrapped in a tighter helix, which reduces the elastic expansion potential of the patch 100. Another advantage of the externally loaded patch is that a smaller amount of force is required to release the patch 100 externally from the deployment tool 500. For example, one end of the patch 100 can be released by sliding the sleeve 506, and the patch 100 elastically unfurls and separates from the deployment tool 500. In contrast, a greater amount of pressure is needed to launch the patch 100 out of the cavity 702 using fluid pressure pushing on a sliding seat.

For an internally housed wellbore patch, an advantage is that the patch 100 is externally protected from damage during deployment. Another advantage is that the spiraled sheet(s) inside the cavity 702 can extend the entire length of the inside of the deployment tool 700. In contrast, the patch 100 loaded on the exterior of the deployment tool 500 does not extend to the ends of the deployment tool 500 because parts of the deployment tool 500 near the ends is reserved for tongs that hold the deployment tool 500 during deployment. Another advantage of the internally housed patch is that the patch 100 is restrained along its entire length when inside the cavity 702. In contrast, the patch 100 might only be restrained at the ends when loaded on the exterior of the deployment tool 500. This can result in middle portions of the patch becoming partially unfurled before the deployment tool 500 reaches the target location. Another advantage is that multiple spiraled sheets can be loaded into the cavity 702, and the sheets can be ejected together by exerting pressure at one end of the cavity 702. This can enable longer patches to be deployed.

Figure 9:
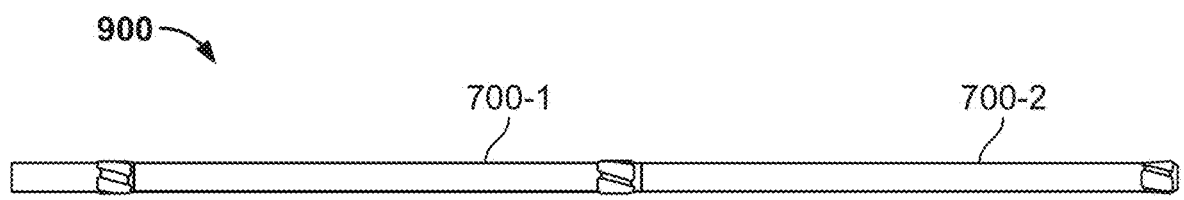
FIG. 9 shows an external view of a string of multiple deployment tools connected end-to-end.
Figure 10:
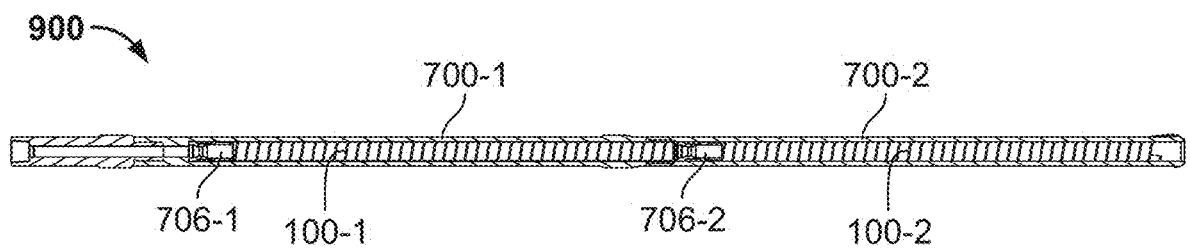
FIG. 10 shows a cross-sectional view of the string of multiple deployment tools connected end-to-end.

FIGS. 9 and 10 illustrate an example string of connected deployment tools. FIG. 9 shows an external view of a string 900 of two deployment tools connected end-to-end. FIG. 10 shows a cross-sectional view of the string 900 of two deployment tools connected end-to-end.

The string 900 includes deployment tools 700-1, 700-2. The deployment tools 700-1, 700-2 each house a respective wellbore patch. The deployment tool 700-1 houses wellbore patch 100-1. The deployment tool 700-2 houses wellbore patch 100-2. In some examples, instead of multiple patches being deployed in multiple respective deployment tools connected in a string, the multiple patches can be loaded in a single, longer deployment tool.

The patches 100-1, 100-2 can be deployed individually or deployed simultaneously in a single operation. In some examples, the patches 100-1, 100-2 can be released such that the patches overlap and form a continuous tube in the wellbore.

To launch the patches 100-1, 100-2 individually, a first dropped ball passes through the first deployment tool 700-1 and lands in the lowermost sliding seat 706-2. The sliding seat 706-2 acts on and deploys the lowermost patch 100-2. A second dropped ball is then dropped and lands in the upper sliding seat 706-1. The sliding seat 706-1 acts on and deploys the upper patch 100-1. The first ball can be smaller than the second ball, and can be smaller than an opening in the sliding seat 706-1. The smaller first ball thus passes through the first deployment tool 700-1 to reach the second sliding seat 706-2 instead of landing in the first sliding seat 706-1. Any number of patches can be deployed in this method with a single string 900 of deployment tools.

The ability to assemble very long patches with multiple deployment tools on a single drill string trip can enable patching of large loss zones. The deployment tool string 900 can be moved within the wellbore so that each deployed patch overlaps the next adjacent patch. This overlapping method can present a continuous patch barrier to the formation without gaps.

Figure 11:
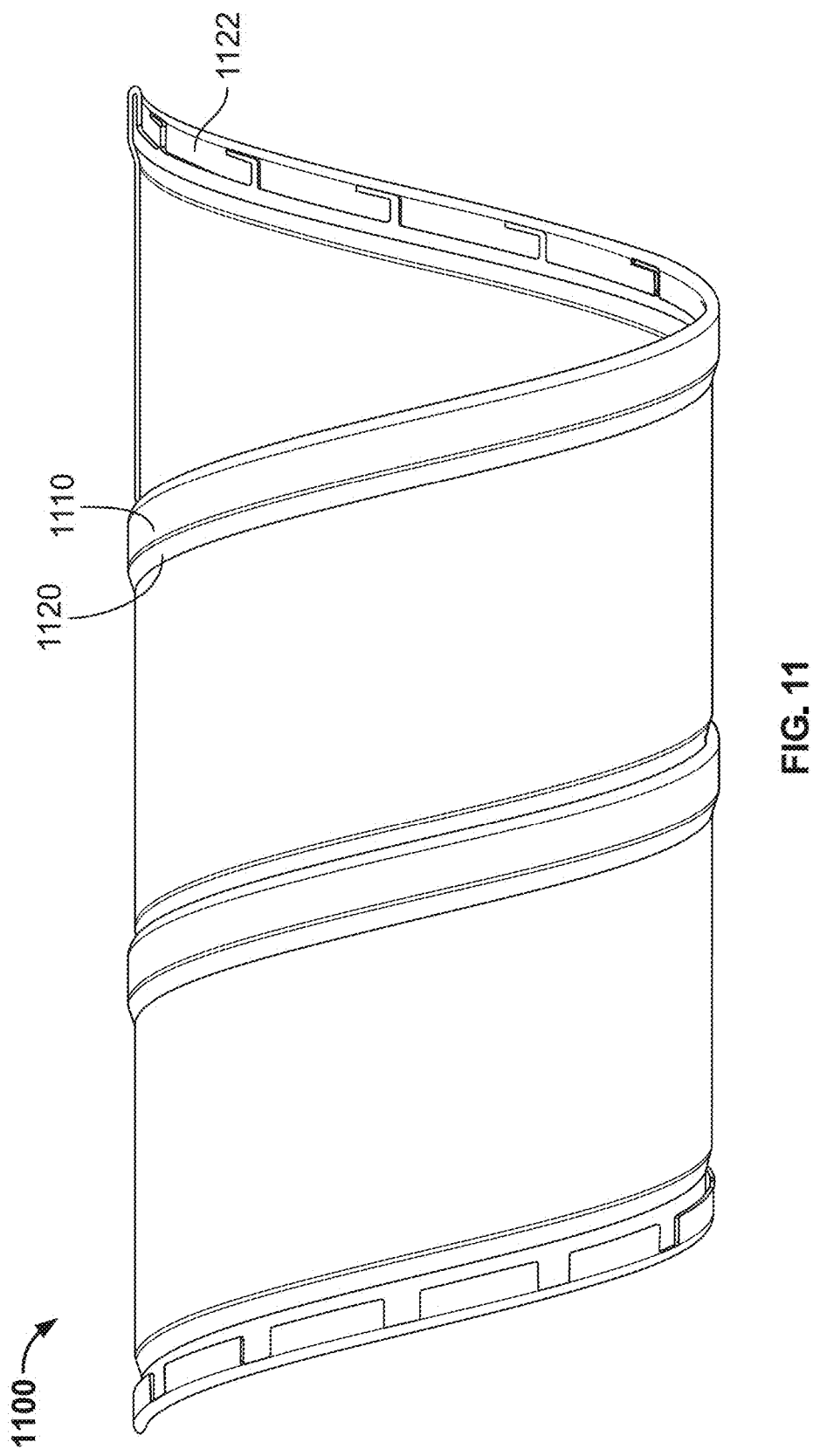
FIG. 11 shows an example patch with coupling features that provide one-way sliding between edges.

FIG. 11 shows an example patch 1100 with coupling features that provide one-way sliding between edges. The overlapping edges of the patch 1100 can include bent tabs 1122 or similar features that spring or fall into notches of the adjacent edge while the patch 1100 unfurls. This provides a one-way ratcheting feature, preventing an expanded patch 1100 from compressing after being unfurled. Thus, an unfurled patch 1110 can be locked in the expanded position. In some examples, the bent tabs are integral with the patch and are formed from the patch material.

In some examples, the bent tabs 1122 can be configured to lock the patch 1100 in a compressed position instead of in an expanded position. In some examples, the bent tabs 1122 can be configured to lock the patch 1100 to a particular predetermined diameter.

Figure 12:
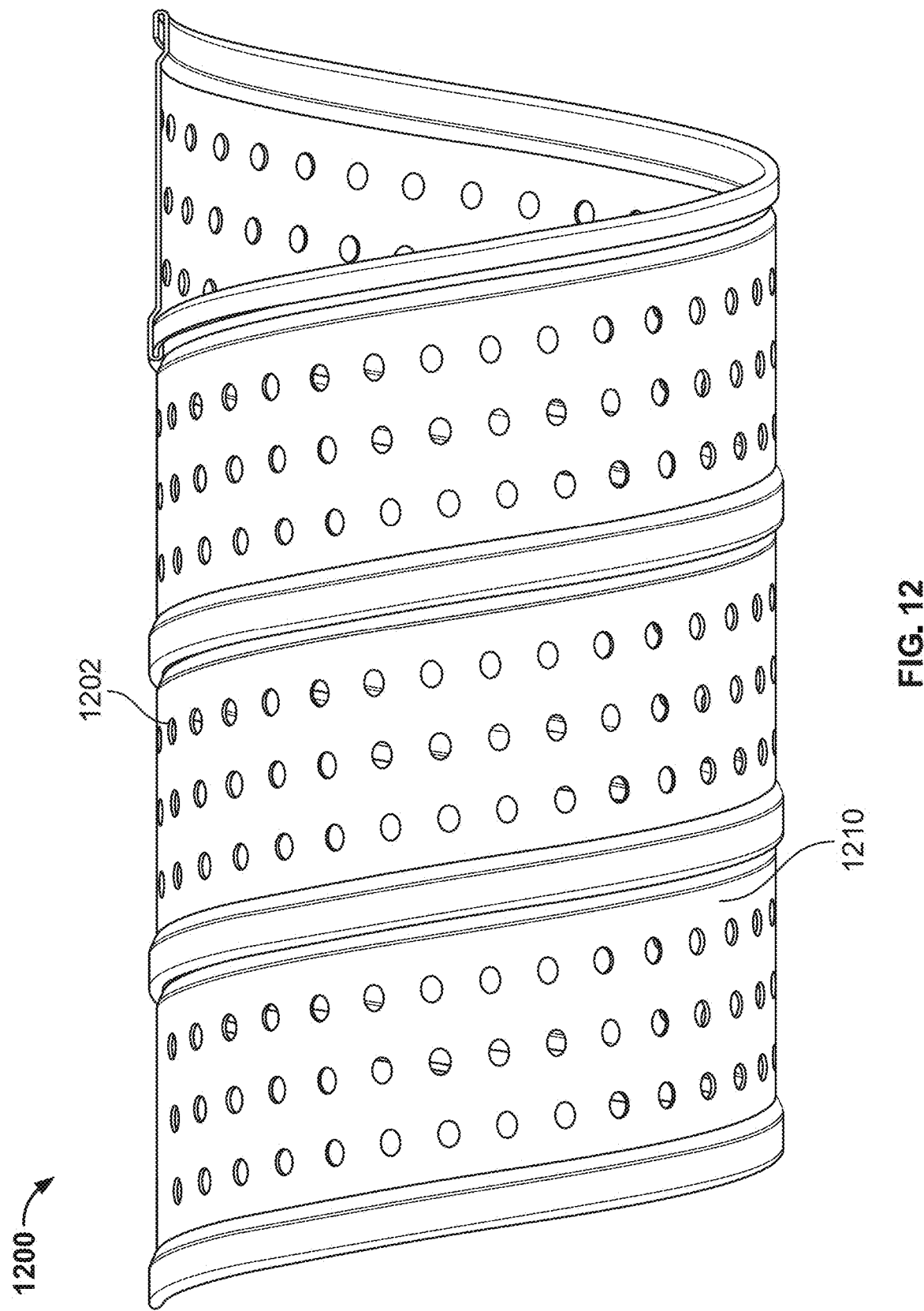
FIG. 12 shows an example patch including perforations in the spiraled sheet.

FIG. 12 shows an example patch 1200 including perforations 1202 in the spiraled sheet 1210. The sheet 1210 can be perforated, slotted, or can include any similar penetration shape to form a porous screen. The perforated sheet 1210 can be used, for example, to deploy a temporary screen to prevent hole collapse at a zone where production is later required, or as a retrofit sand screen patch in already perforated cased tubulars.

Figure 13:
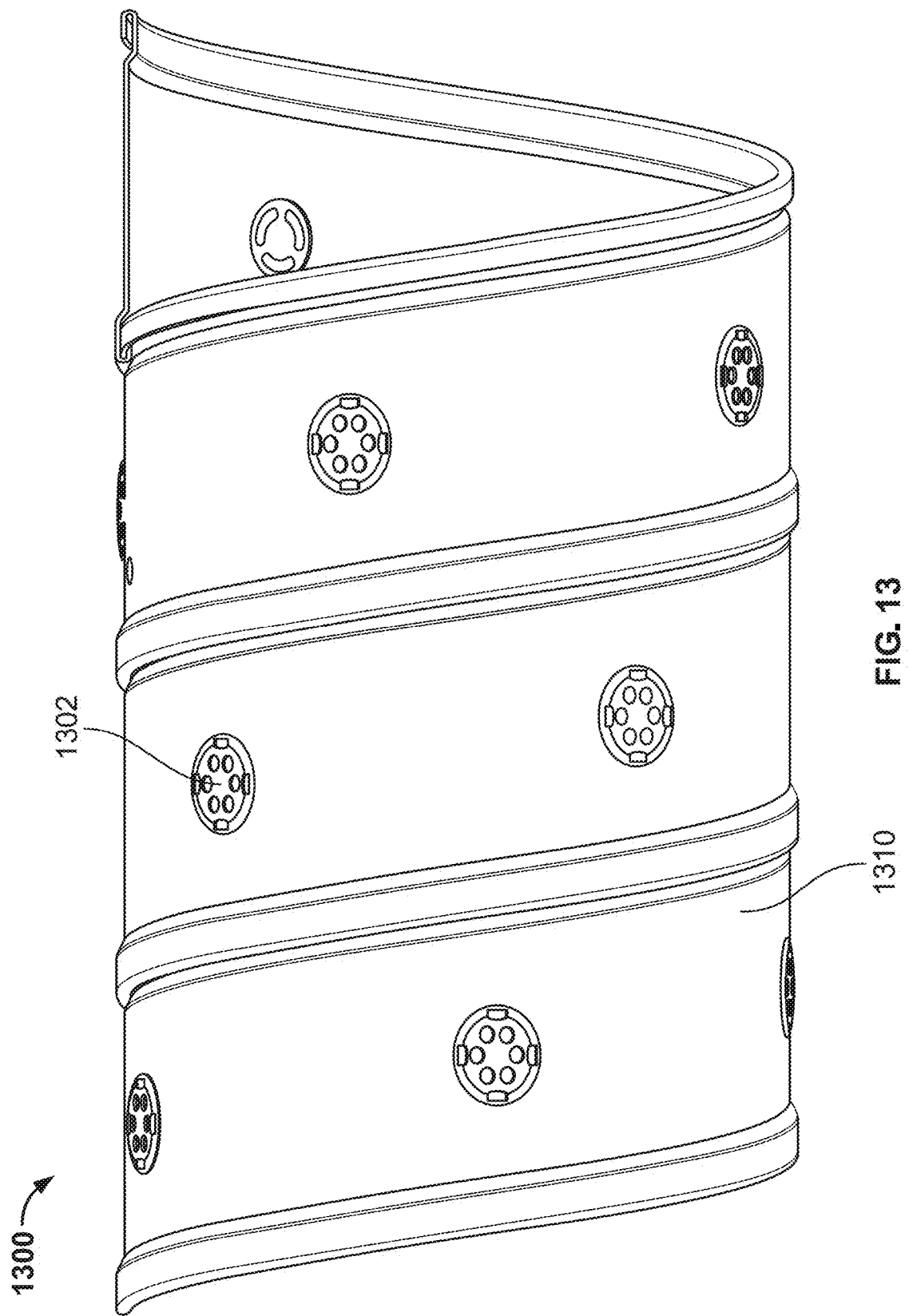
FIG. 13 shows an example patch including inflow control devices in the spiraled sheet.

FIG. 13 shows an example patch 1300 including inflow control devices (ICD) 1302 in the spiraled sheet 1310. The patch 1300 can include various components integrated into the spiraled sheet 1310. For example, ICDs 1302 can be used to allow hydrocarbon flow through the sheet 1310. The ICDs 1302 close in the presence of water, preventing water from flowing through the sheet 1310. The ICDs 1302 have a shallow height. The ICDs 1302 can be threaded, welded, or otherwise attached to the sheet 1310. The patch 1300 formed from the sheet 1310 can be deployed into the wellbore 120 such that the ICDs are on the perimeter of the patch 1300. Other tools, sensors, and/or equipment can be attached or integrated to the patch 1300 and deployed into the well. Because the sides of the patch 1300 are thin, the attached devices can have minimal effect on the open diameter of the wellbore 120.

A previously deployed patch can be removed from a wellbore. For example, a deployment tool 500 can be deployed which can re-tighten the patch and reduce the patch diameter for retrieval. In some examples, the uppermost free end of the patch can be hooked and pulled, causing the spiraled sheet to unfurl and straighten.

The patch can be used as a sleeve, to be moved axially along a tubular. Elastic spring of the patch can hold the patch in position, but when subjected to sufficient force (for example on by a setting tool) the patch can be axially translated. This could, for example, be used to open and close ports, expose or hide geometric features (shoulders, recesses), or for any other similar purpose.

Similarly, the patch can be cylindrically rotated on a tubular to hide or expose geometric features such as pockets, recesses or similar. In some examples, the patch can combine rotation and axial motions, combine with a radial dilation or compression, or any other movement combination.

The patch can be designed to spring either outward or inward. In certain applications, the patch can be forcibly unfurled such that it then elastically reduces in diameter. In this way, the patch can grip the exterior of a tubular. For example, temporary anchoring can be used to hold the expanded spiraled sheet in place. Release of the anchoring causes the patch to collapse. The collapsed patch can grip the tubular within the hollow interior. A collapsing patch can be used in applications where the patch is intended for retrieval, forcibly expanding the patch on deployment and relying on mechanical recovery and spring back during retrieval. A collapsing patch can be used to attach items to the exterior or casing. For example, the collapsing patch can be used to attach casing centralizers or to protect external hydraulic lines when casing is run. Alternatively, the collapsing patch can be used to attach items to the exterior of tubing such as power cables.

Wells can experience hydraulic line or cable failure. For example, a hydraulic line is sometimes run behind casing or between casing strings. This line can fail. Access to the failed line is challenging since it is behind the casing wall. The hydraulic line must be repaired or replaced to restore functionality to the equipment it serves.

The hydraulic line can be replaced with one within the inner casing. Running any replacement line through the wellbore though can be problematic because the new line is vulnerable to damage and is unconstrained radially within the wellbore. Well workover, intervention or similar tasks risk snagging this freely moving and vulnerable hydraulic line or cable.

The patch can be used to forcibly constrain the replacement hydraulic line against the wall, trapping the hydraulic line between the patch and the casing. The patch can provide protection to prevent the line being damaged when tools are run past. The patch can enable new hydraulic line repair techniques and processes. Similarly, many other well cabling types share the same damage risks. The patch can be used to anchor cables, sensors, wires, and fiber optics to the sidewall or to clamp these items to tubing. The patch can enable the upgrading of existing wells with fiber, or to introduce new downhole equipment to old and existing wells.

If well casing or cement is damaged it is sometimes necessary to repair this damaged area. For example, casing-to-casing annulus (CCA) fluid migration sees unwanted fluid travelling between cemented casing strings. A method to address this requires removal of a portion of the innermost casing to gain access. This casing aperture can be then filled to finalize the repair. It can be difficult to retain and support repair material from the wellbore while it cures or sets. The patch can be used as a temporary dam to hold the repair media, preventing the repair media from slumping into the wellbore until solidified or cured. The patch can be used to patch casing or tubing areas previously perforated.

The process of drilling exposes a section of wellbore. After a suitable drilled length, the open hole is lined with casing, which can be cemented in place. The patch can be deployed as a temporary tubular, supporting the open hole formation and helping to prevent collapse. This can allow longer sections of open hole to be drilled before casing is run.

It is understood that the articles "a," "an," and "the" in this disclosure are intended to mean that there are one or more of the elements in the preceding descriptions. The terms "comprising," "including," and "having" are intended to be inclusive and mean that there can be additional elements other than the listed elements. Additionally, it should be understood that references to "one example" or "an example" of the present disclosure are not intended to be interpreted as excluding the existence of additional examples that also incorporate the recited features. For example, any element described in relation to an example herein can be combinable with any element of any other example described herein. Numbers, percentages, ratios, or other values stated herein are intended to include that value, and also other values that are "about" or "approximately" the stated value, as would be appreciated by one of ordinary skill in the art encompassed by examples of the present disclosure. A stated value should therefore be interpreted broadly enough to encompass values that are at least close enough to the stated value to perform a desired function or achieve a desired result. The stated values include at least the variation to be expected in a suitable manufacturing or production process, and can include values that are within 5%, within 1%, within 0.1%, or within 0.01% of a stated value.

The terms "approximately," "about," and "substantially" as used herein represent an amount close to the stated amount that still performs a desired function or achieves a desired result. For example, the terms "approximately," "about," and "substantially" can refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

While this specification contains many specifics, these should not be construed as limitations on the scope of the disclosure or of what can be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some examples be excised from the combination, and the claimed combination can be directed to a sub-combination or variation of a sub-combination.

A number of implementations have been described. Nevertheless, it will be understood that various modifications can be made without departing from the spirit and scope of the disclosure. Accordingly, other implementations are within the scope of the following claim(s). For example, various forms of the flows shown above can be used, with steps re-ordered, added, or removed. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous. Moreover, aspects described with reference to any figure or any implementation can be combined with aspects described with any other figure or any other implementation.

The invention claimed is:

1. A wellbore patch, comprising:
a radially expandable tube member, comprising:
a sheet wrapped in a spiral, the sheet comprising:
a first circumferential edge; and
a second circumferential edge opposite the first circumferential edge and coupled to the first circumferential edge, the coupling between the first circumferential edge and the second circumferential edge configured to permit relative motion between spiraled turns of the sheet in a circumferential direction and configured to prohibit relative motion between the spiraled turns of the sheet in a longitudinal direction; and
a hollow interior.

2. The wellbore patch of claim 1, wherein the first circumferential edge is bent to form a first hook, the second circumferential edge is bent to form a second hook, and the first circumferential edge is coupled to the second circumferential edge by the first hook engaging the second hook.

3. The wellbore patch of claim 2, wherein:
the first hook is bent towards a radial center of the tube member; and
the second hook is bent away from the radial center of the tube member.

4. The wellbore patch of claim 1, wherein radial expansion of the tube member causes longitudinal compression of the tube member.

5. The wellbore patch of claim 1, wherein longitudinal expansion of the tube member causes radial compression of the tube member.

6. The wellbore patch of claim 1, wherein radial expansion of the tube member is a result of elastic unfurling of the sheet.

7. A wellbore patching system comprising:
a radially expandable tube member, comprising:
a sheet wrapped in a spiral, the sheet comprising:
a first circumferential edge; and
a second circumferential edge opposite the first circumferential edge and coupled to the first circumferential edge, the coupling between the first circumferential edge and the second circumferential edge configured to permit relative motion between spiraled turns of the sheet in a circumferential direction and configured to prohibit relative motion between spiraled turns of the sheet in a longitudinal direction; and
a hollow interior; and
a deployment tool comprising:
a tool body; and
a restraining device coupled to the tool body and configured to prevent radial expansion of the tube member when the tool body is positioned within the hollow interior of the tube member and the restraining device is applied to the tube member.

8. The wellbore patching system of claim 7, wherein the restraining device comprises a fastener configured to attach to the tube member.

9. The wellbore patching system of claim 7, wherein the restraining device comprises a sleeve configured to slide over a portion of the tube member.

10. The wellbore patching system of claim 7, wherein the first circumferential edge is bent to form a first hook, the second circumferential edge is bent to form a second hook, and the first circumferential edge is coupled to the second circumferential edge by the first hook engaging the second hook.

11. The wellbore patching system of claim 10, wherein:
the first hook is bent towards a radial center of the tube member; and
the second hook is bent away from the radial center of the tube member.

12. A method for deploying a wellbore patch, comprising:
positioning a tool body of a deployment tool within a hollow interior of a tube member, the tube member comprising:
a sheet wrapped in a spiral, the sheet comprising:
a first circumferential edge; and
a second circumferential edge opposite the first circumferential edge and coupled to the first circumferential edge, the coupling between the first circumferential edge and the second circumferential edge configured to permit relative motion between spiraled turns of the sheet in a circumferential direction and configured to prohibit relative motion between spiraled turns of the sheet in a longitudinal direction; and
a hollow interior;
applying a restraining device of the deployment tool to the tube member, wherein the restraining device is coupled to the tool body and is configured to prevent radial expansion of the tube member;
inserting the deployment tool and the tube member into a wellbore;
releasing the restraining device from the tube member to radially expand the tube member; and
removing the deployment tool from the wellbore.

13. The method of claim 12, wherein positioning the deployment tool within the hollow interior of the tube member comprises wrapping the sheet around the tool body.

14. The method of claim 12, wherein applying the restraining device to the tube member comprises attaching a fastener to the tube member.

15. The method of claim 14, wherein releasing the restraining device from the tube member comprises detaching the fastener from the tube member.

16. The method of claim 12, wherein applying the restraining device to the tube member comprises sliding a sleeve over a portion of the tube member.

17. The method of claim 16, wherein releasing the restraining device from the tube member comprises sliding the sleeve to uncover the tube member.

18. The method of claim 12, wherein radial expansion of the tube member is a result of elastic unfurling of the sheet.

\* \* \* \* \*